(12) United States Patent
Schurig et al.

(10) Patent No.: US 6,273,487 B1
(45) Date of Patent: Aug. 14, 2001

(54) SLIDING FLOOR PANEL IN COMBINATION WITH ARTICULATING CARGO DOOR

(75) Inventors: Darren Schurig, Irvine, CA (US); Jonathan L. Rundels, Rochester, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/394,182

(22) Filed: Sep. 10, 1999

Related U.S. Application Data

(63) Continuation-in-part of application No. 09/222,564, filed on Dec. 29, 1998, now Pat. No. 6,089,648.

(51) Int. Cl.[7] .................................................. B62D 25/20
(52) U.S. Cl. .................... 296/37.14; 296/76; 296/100.05
(58) Field of Search ........................... 296/26.08, 26.09, 296/37.1, 37.8, 37.14, 50, 52, 76, 100.03, 100.05, 106, 146.8, 208; 49/152, 157, 163, 188, 213, 276, 360

(56) References Cited

U.S. PATENT DOCUMENTS

| | | | |
|---|---|---|---|
| 2,094,401 | * | 9/1937 | Girl ........................................ 414/462 |
| 2,626,179 | * | 1/1953 | Gonzalez ............................. 296/26.1 |
| 2,797,828 | * | 7/1957 | Fritsche ................................. 414/522 |
| 2,852,303 | * | 9/1958 | Hopson .............................. 296/26.09 |
| 3,338,620 | * | 8/1967 | Cauvin ............................... 296/37.14 |
| 4,398,765 | * | 8/1983 | Ishikawa ................................ 296/37.2 |
| 5,080,417 | * | 1/1992 | Kanai ................................... 296/37.3 |
| 5,098,146 | | 3/1992 | Albrecht et al. ....................... 296/26 |
| 5,218,794 | * | 6/1993 | Ehrlich .................................... 52/64 |
| 5,251,950 | * | 10/1993 | Bernardo .............................. 296/98 |
| 5,257,846 | * | 11/1993 | Kanai et al. ...................... 296/37.14 |
| 5,441,183 | * | 8/1995 | Frenzel ................................. 224/542 |
| 5,536,061 | | 7/1996 | Moore et al. ......................... 296/155 |
| 5,836,637 | | 11/1998 | Laginess et al. ....................... 296/75 |
| 5,938,262 | * | 8/1999 | Mills ................................. 296/26.09 |
| 5,944,371 | * | 8/1999 | Steiner et al. .................... 296/26.09 |
| 6,027,155 | * | 2/2000 | Wisniewski et al. ............... 296/37.1 |

* cited by examiner

*Primary Examiner*—D. Glenn Dayoan
*Assistant Examiner*—Paul Chenevert
(74) *Attorney, Agent, or Firm*—Mark P. Calcaterra

(57) ABSTRACT

A lid assembly for a motor vehicle having an articulating closure member which is retractable into a cavity below the level of the floor of the vehicle. The lid assembly includes a lid member and a conveyance assembly having a support structure and a drive assembly. The lid member is supported over the cavity by the support structure and the drive assembly moves the lid member between a first position wherein the lid member substantially covers the cavity, and a second position wherein the lid member at least partially clears the cavity.

20 Claims, 4 Drawing Sheets

SLIDING FLOOR PANEL IN COMBINATION WITH ARTICULATING CARGO DOOR

CROSS REFERENCE TO RELATED APPLICATION

This is a continuation-in-part of U.S. Ser. No. 09/222,564 filed Dec. 29, 1998 now U.S. Pat. No. 6,089,648.

BACKGROUND OF THE INVENTION

1. Technical Field

The present invention pertains generally to motor vehicles. More particularly, but without restriction to the particular embodiment and/or use which is shown and described for purposes of illustration, the present invention pertains to a translating floor assembly for use in a vehicle having a closure member which retracts to a closed position below the surface of the vehicle floor.

2. Discussion

Sport utility vehicles, station wagons, minivans and other similar vehicles generally include rear storage areas accessible through one or more rear closure panels. In one common arrangement, such vehicles are equipped with a liftgate which articulates between open and closed positions about an upper horizontal edge. In another common arrangement, such vehicles are equipped with a lower tailgate which pivots about a lower horizontal edge. In yet another common arrangement, such vehicles are equipped with a lower tailgate which pivots about one of the lateral vertical edges. Tailgates have also been employed which may be selectively pivoted about one of the lateral vertical edges or a lower horizontal edge.

While known closure panels are suitable for providing access to the rear storage area of a motor vehicle, they are all associated with disadvantages. Most significantly insofar as the present invention is concerned relates to the, articulation of known closure panels from a closed position to an open position causes the closure panel to extend away from the body of the vehicle. When the vehicle is parked in a garage or near other vehicles, sufficient operating clearance is often unavailable for opening the closure panel. Additionally, articulation of the closure panel away from the body of the vehicle increases the opportunity for damage to the closure panel, the adjacent vehicle, or both.

Accordingly, a closure member that withdraws under the floor of the vehicle as it is moved into the open position eliminates the above-enumerated concerns. Additionally, such a closure member is particularly suited for operation under power to provide consumers with a convenient means for accessing the vehicle interior when carrying loads such as children, groceries or other materials. However, a significant drawback associated with such closure members concerns the amount of clearance between the closure member and the floor of the vehicle.

Typically, a large amount of clearance is needed between the closure member and the floor of the vehicle in such arrangements to prevent the closure member from contacting the floor of the vehicle as it articulates between the open and closed positions. The magnitude of clearance that is needed is sufficiently large to permit small objects to fall into the cavity where the closure member is stored or lodge between the floor of the vehicle and the closure member. The safety of those in or around the vehicle is also an issue as it can be fairly easy for one to place their fingers or toes into the clearance area prior to cycling the drive mechanism to open or close the closure member.

SUMMARY OF THE INVENTION

It is a general object of the present invention to provide a vehicle floor system for a vehicle having a closure member that retracts under the floor of the vehicle which overcomes the disadvantages associated with the prior known arrangements.

It is another object of the present invention to provide a sliding floor for use in a motor vehicle which substantially eliminates clearance between the edge of the floor and a vehicle closure member.

In one form, the present invention provides a lid assembly for a motor vehicle having an articulating closure member which is retractable into a cavity below the level of the floor of the vehicle. The lid assembly includes a lid member and a conveyance assembly having a support structure and a drive assembly. The lid member is supported over the cavity by the support structure and the drive assembly moves the lid member between a first position wherein the lid member substantially covers the cavity, and a second position wherein the lid member at least partially clears the cavity.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
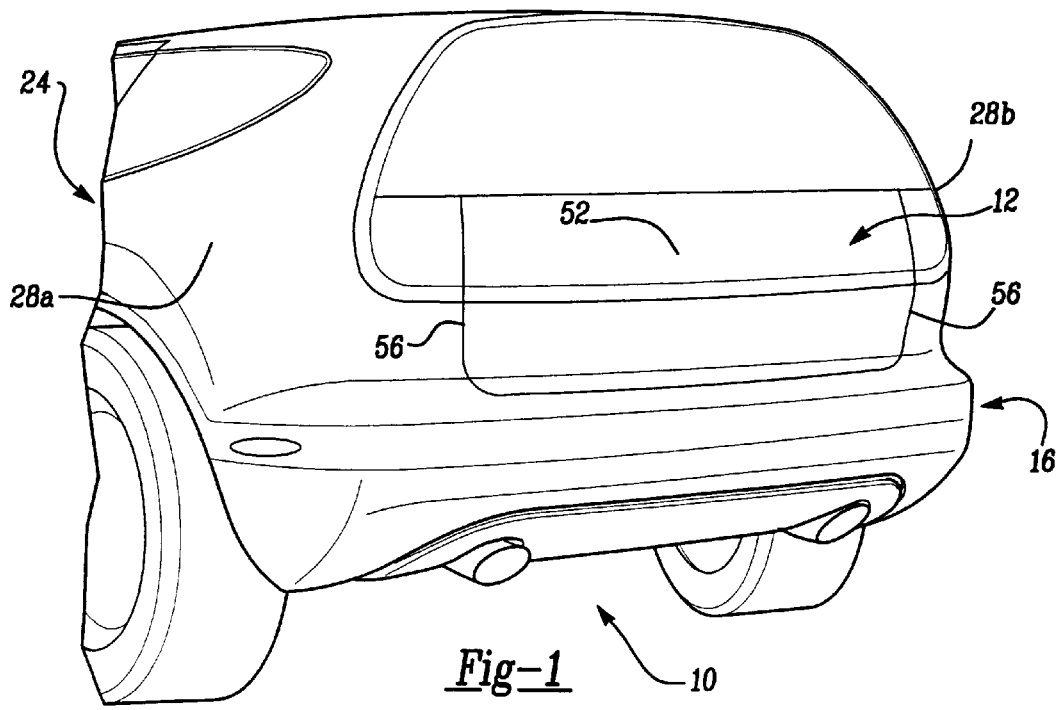
FIG. 1 is a rear view of an exemplary motor vehicle incorporating a translating lid member constructed in accordance with the teachings of a preferred embodiment of the present invention.
Figure 2:
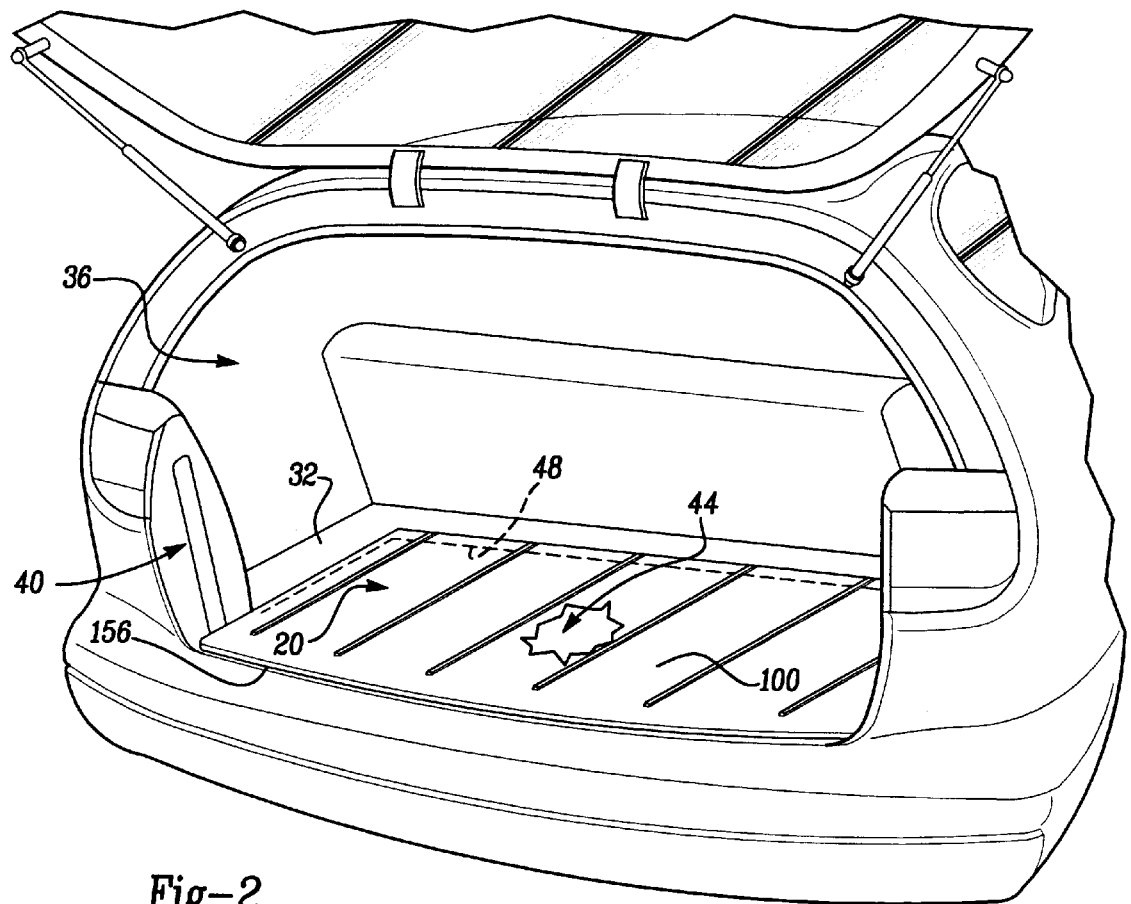
FIG. 2 is an enlarged rear perspective view of the exemplary motor vehicle of FIG. 1, illustrating the cargo door articulated to an open position.

With reference to FIGS. 1 and 2 of the drawings, a motor vehicle constructed in accordance with the teachings of the preferred embodiment of the present invention is generally identified by reference numeral 10. As will be discussed in detail below, motor vehicle 10 includes a closure panel 12 which is articulated between a closed position and an open position under a source of power. It will be understood that the particular type of vehicle illustrated through out the drawings is merely exemplary. In this regard, the teachings of the present invention have applicability to other types of vehicles.

In a conventional manner, motor vehicle 10 includes a rear bumper assembly 16 a lid assembly 20 and a body 24 having a pair of laterally spaced apart sides 28a, 28b and a floor 32. The sides 28a, 28b, floor 32 and lid assembly 20 cooperate to form a rear storage area 36 accessible through a rear opening 40 in motor vehicle 10. Body 24 further defines a cavity 44 recessed beneath floor 32. Floor 32 abuts the laterally opposed edges 48 of cavity 44 and terminates at the rear end of vehicle 10 proximate rear opening 40.

Figure 3A:
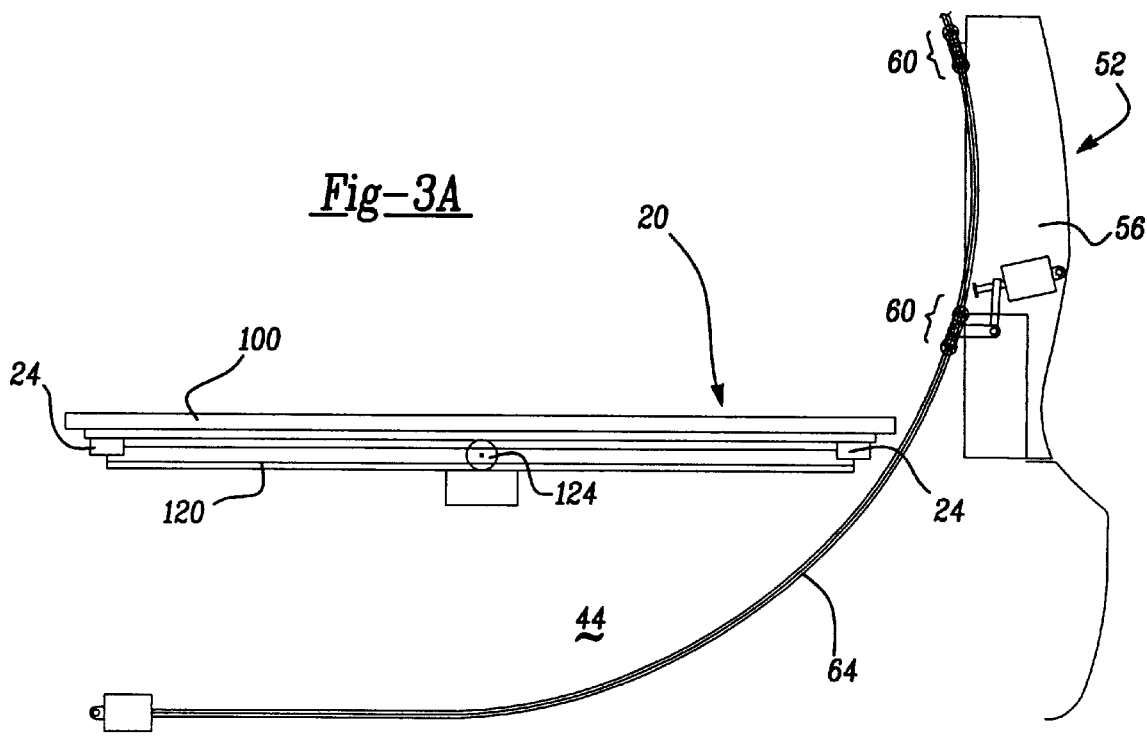
FIGS. 3A, 3B and 3C are schematic side views of the lid member and cargo door showing the lid member in various positions as the cargo door is moved into the open position.
Figure 3B:
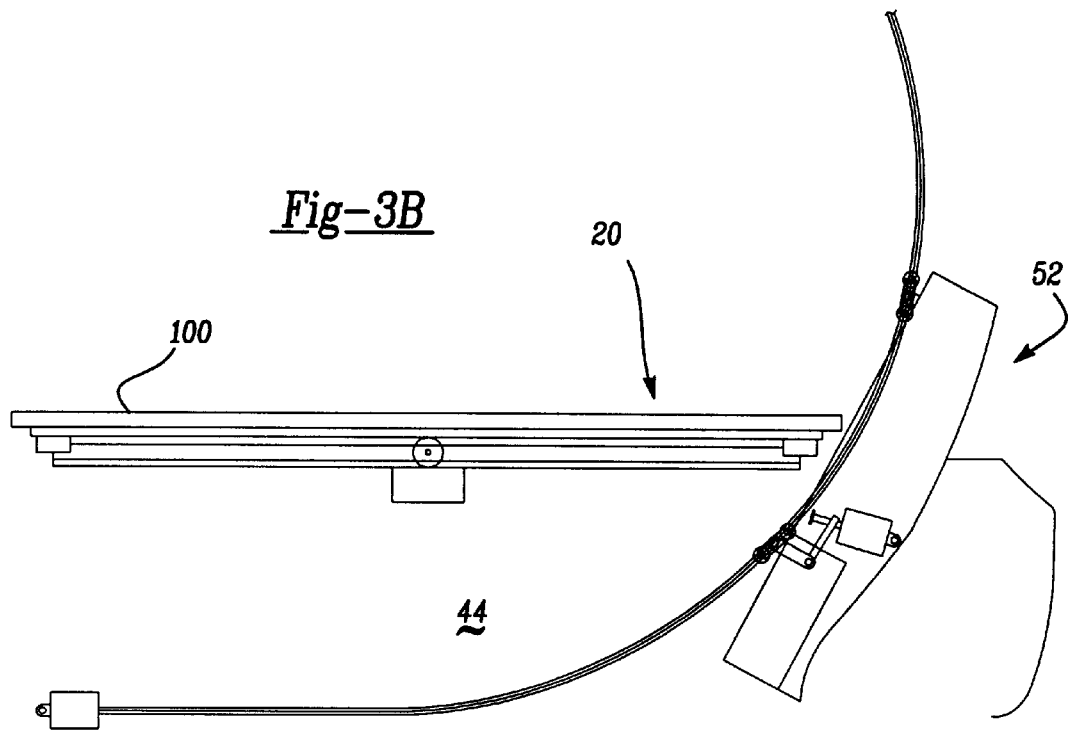
Figure 3C:
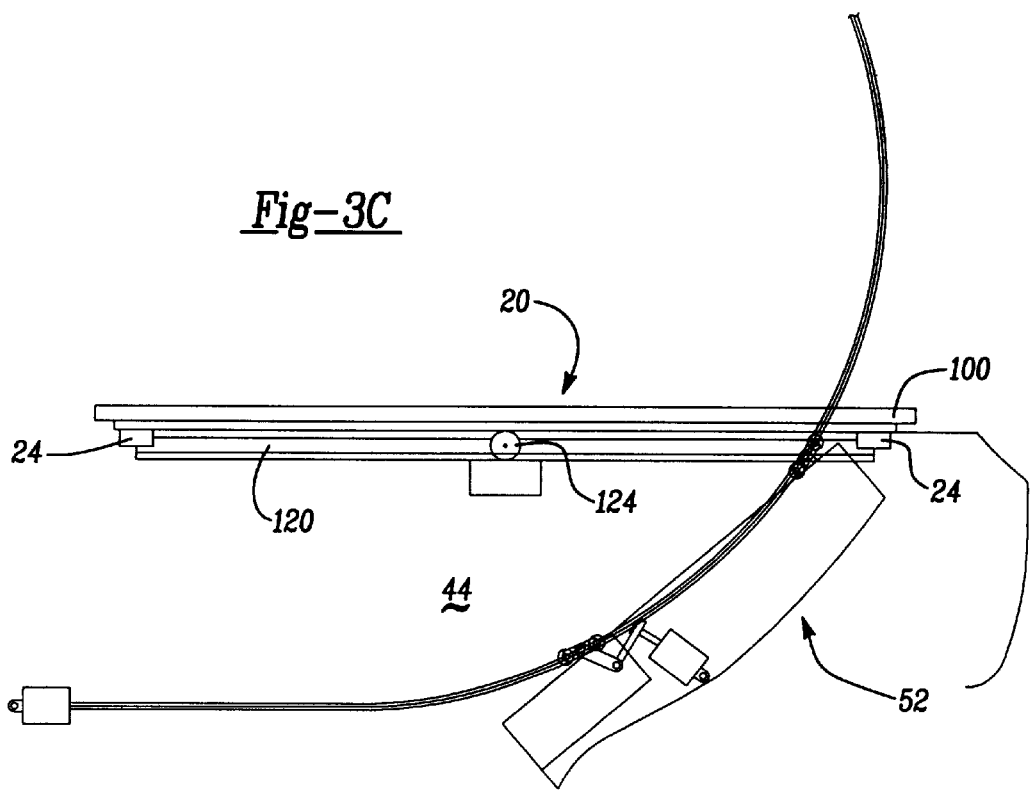

The closure panel 12 is preferably illustrated as a tailgate 52. A detailed description of tailgate 52 is beyond the scope of the present invention and need not be provided herein. Briefly, tailgate 52 is mounted on its lateral sides 56 to a roller assembly 60 which engages a grooved guide track 64 as shown in FIGS. 3A through 3C. A tailgate drive unit (not specifically shown) is operable for moving tailgate 52 between a closed position, wherein tailgate 52 is in a substantially vertical position, and an open position wherein tailgate 52 is disposed below floor 32 in cavity 44. Tailgate 52 is described in more detail in commonly assigned U.S. Ser. No. 09/222,564, filed Dec. 29, 1998, which is hereby incorporated by reference as if fully set forth herein.

Figure 4:
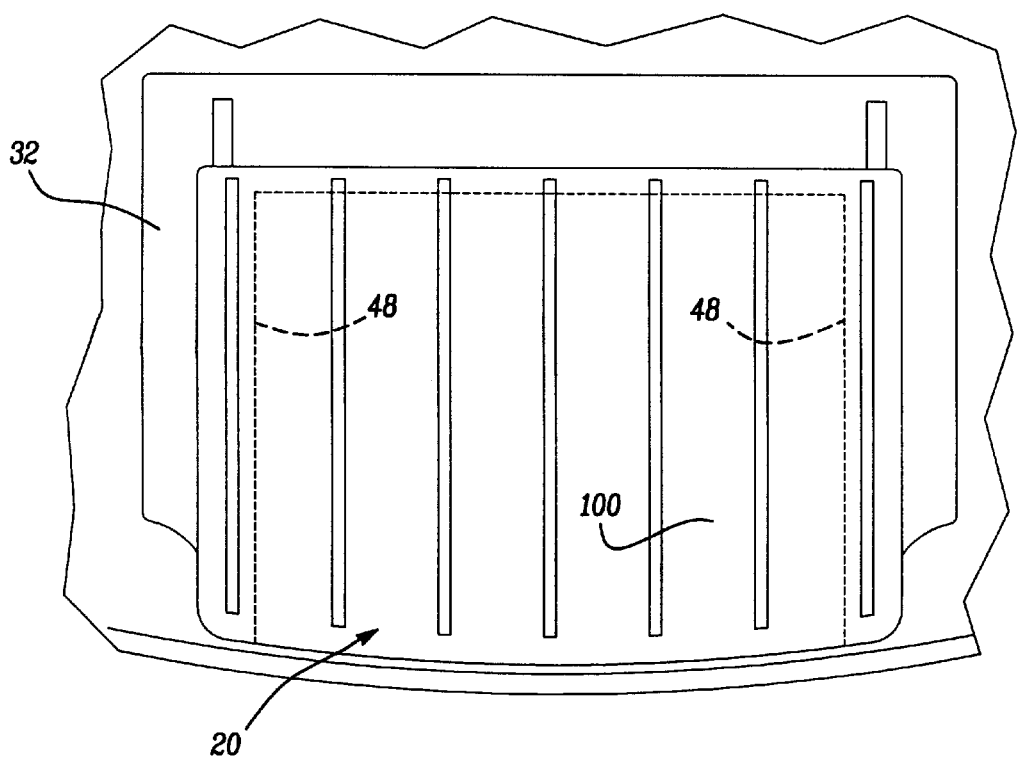
FIG. 4 is a top view of the floor of the exemplary motor vehicle of FIG. 1, illustrating the lid member translated to the rearward position.
Figure 5:
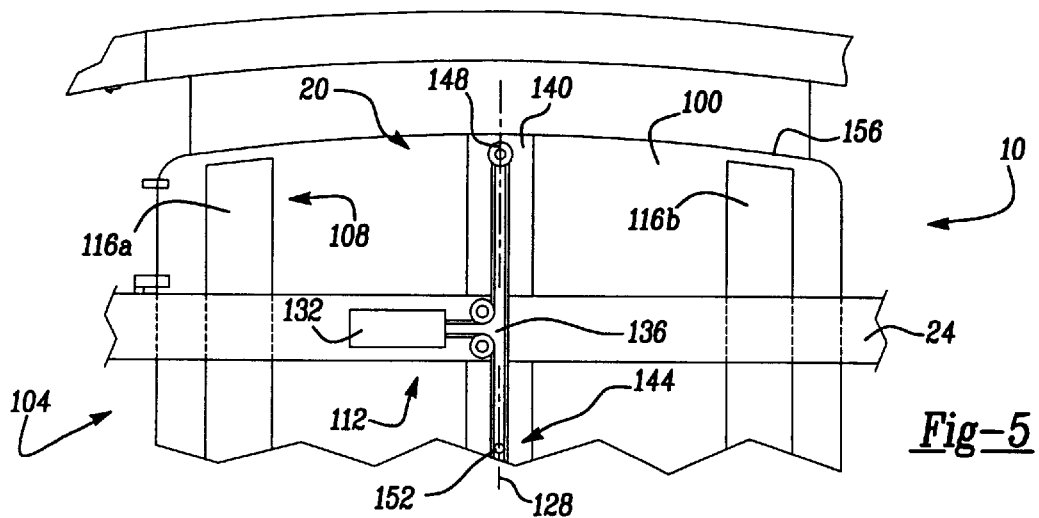
FIG. 5 is a bottom view of the exemplary motor vehicle of FIG. 1, illustrating the lid member translated to the forward position.

As shown in FIGS. 4 and 5, lid assembly 20 includes a lid member 100 and a conveyance assembly 104. Lid member 100 is a generally horizontal structure sized to substantially cover cavity 44 and border the edges of floor 32 proximate the laterally opposed edges 48 of cavity 44. Alternatively, lid member 100 may fully or partially overlap the edges of floor 32.

Conveyance assembly 104 includes a support structure 108 and a drive assembly 112. Support structure 108 is fixed to body 24 and operable for supporting lid member 100 above cavity 44. In the particular embodiment illustrated, support structure 108 is a pair of conventional linear slides 116a, 116b having first and second portions 120 and 124, respectively which are mounted parallel to the longitudinal axis 128 of vehicle 10. First portion 120 is fixedly coupled to body 24 and second portion 124 is fixedly coupled to lid member 100, thereby permitting lid member 100 to slide between a first position substantially covering cavity 44 as shown in FIG. 2, and a second position at least partially clearing cavity 44 as shown in FIG. 4. Linear slides 116a, 116b preferably include rollers or bearings to permit first and second portions 120 and 124 to be moved relative to one another with a reduced level of frictional drag as lid member 100 is moved between the first and second positions.

Drive assembly 112 is shown to include a drive unit 132 and a drive cable 136. The configuration of drive assembly 112 is substantially identical to that of a window regulator used to drive power windows between an open and a closed position and as such, need not be discussed in further detail herein. Briefly, the first and second ends 140 and 144, respectively, of drive cable 136 are coupled to lid member 100 at first and second points 148 and 152, respectively. Drive unit 132 engages drive cable 136 such that operation of drive unit 132 in a first mode moves drive cable 136 in a predetermined first direction which causes lid member 100 to translate toward the first position. Operation of drive unit 132 in a second mode moves drive cable 136 in a predetermined second direction which causes lid member 100 to translate toward the second position.

When a signal is generated to cause tailgate 52 to articulate from either of the open and closed positions, drive assembly 132 is actuated. In response thereto, lid member 100 slides from the first position to the second position where the forward edge 156 of lid member 100 overlaps the rearward edge of cavity 44. After tailgate 52 has articulated into either of the closed and open positions, drive assembly 132 is again actuated. In response thereto, lid member 100 slides from the second position to the first position and substantially covers cavity 44.

Figure 6:
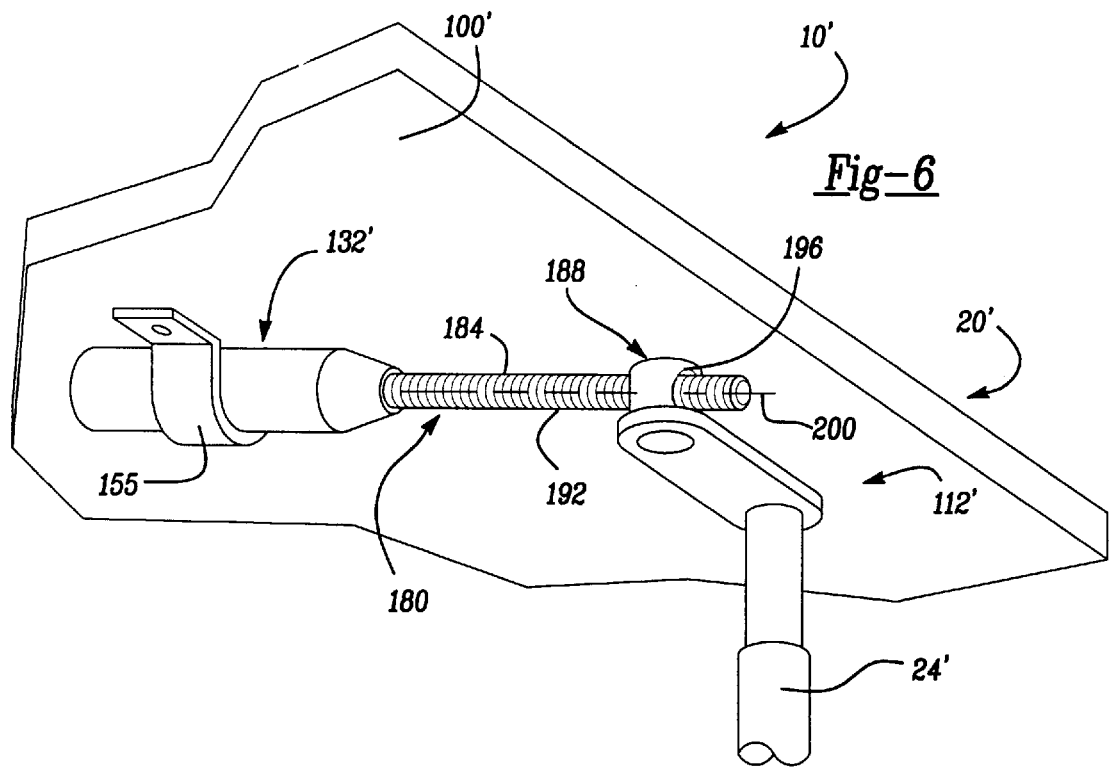
FIG. 6 is an enlarged view of the bottom of a motor vehicle similar to that of FIG. 5 but illustrating another drive unit for translating the lid member.

While the lid assembly of the present invention has been described thus far as having a drive assembly substantially identical to that of a window regulator for a power window and a support structure formed from linear slides, those skilled in the art will appreciate that the invention, in its broader aspects, may be constructed somewhat differently. For example, the drive assembly may be formed from a device similar to those employed in power seating systems as shown in FIG. 6.

In this arrangement, drive assembly 112' includes a drive unit 132' and a screw assembly 180 having a first screw portion 184 and a second screw portion 188. Drive unit 132' is coupled to lid member 100' with a clamp 155. First screw portion 184 includes an externally threaded portion 192 and is coupled for rotation with an output shaft of drive unit 132'. Second screw portion 188 includes an internally threaded portion 196 and is fixedly coupled to body 24'. The threads of externally threaded portion 192 engage the threads of internally threaded portion 196 such that rotation of the output shaft of drive unit 132' in a first rotational direction causes second screw portion 188 to travel in a first direction along the axis 200 of externally threaded portion 192. Similarly, rotation of the output shaft of drive unit 132' in a second rotational direction causes second screw portion 188 to travel in a second direction along the axis 200 of externally threaded portion 192. As Body 24' and second screw portion 188 are fixedly coupled, rotational movement of externally threaded portion 192 is operable for causing lid member 100' to translate along the longitudinal axis of vehicle 10'.

Figure 7:
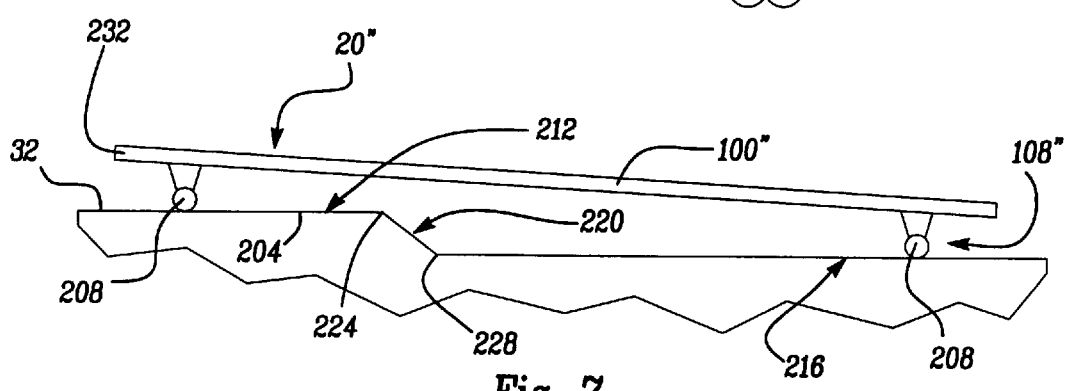
FIG. 7 is a cross sectional view of a portion of the lid assembly constructed according to the teachings of another preferred embodiment of the present invention.

As another example, the support structure may be formed in a manner similar to that shown in FIG. 7. In this arrangement, support structure 108" includes a guide track 204 and a plurality of rollers 208. Guide track 204 includes first and second portions 212 and 216, respectively and a transition portion 220. First portion 212 lies in a generally horizontal plane proximate the forward edge of cavity 44. Second portion 216 also lies in a generally horizontal plane but is spaced apart from the first portion 212. Transition portion 220 is coupled to first portion 212 at a first end 224 and to second portion 216 at a second end 228. Transition portion 220 slopes in a downwardly direction from first portion 212 to second portion 216.

Rollers 208 are coupled to lid member 100" and sized to operate in guide track 204. Movement of lid member 100" from the first position to the second position permits guide track 204 and rollers 208 to cooperatively lift the forward edge 232 of lid member 100" as lid member 100" travels horizontally in the first direction. As such, the forward edge 232 of lid member 100" is raised vertically above floor 32 to permit lid member 100" to overlap floor 32. Movement of lid member 100" from the second position to the first position permits guide track 204 and rollers 208 to cooperatively lower the forward edge 232 of lid member 100" as lid member 100" travels horizontally in the second direction. As such, the forward edge 232 of lid member 100" is substantially flush to floor 32 when lid member 100" is in the first position.

While the invention has been described in the specification and illustrated in the drawings with reference to several preferred embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

What is claimed is:

1. In a vehicle having a body defining an under-floor storage cavity, a lid assembly for selectively covering the storage cavity, the lid assembly comprising:
    a lid member; and
    a conveyance assembly having
        a support structure coupled to the lid member and adapted for supporting the lid member at a predetermined distance away from the vehicle body to permit the lid member to be slid between a first position at least partially clearing the storage cavity and a second position substantially covering the storage cavity; and
        a drive assembly coupled to the lid member at a first end and adapted for coupling to the vehicle body at a second end, the drive assembly operable for conveying the lid member between the first and second positions.

2. The lid assembly of claim 1, wherein the drive assembly includes a drive unit and a drive cable assembly, the drive unit operable in a first mode, the drive cable assembly including a first end coupled to the lid member at a first point and engaging the drive unit such that operation of the drive unit in the first mode moves the drive cable assembly in a predetermined first cable direction to cause the lid member to slide in a predetermined first lid member direction.

3. The lid assembly of claim 2, wherein the drive unit is further operable in a second mode and the drive cable assembly further includes a second end coupled to the lid member at a second point and wherein operation of the drive unit in the second mode moves the drive cable assembly in a predetermined second cable direction to cause the lid member to slide in a predetermined second lid member direction.

4. The lid assembly of claim 1, wherein the drive assembly includes a drive unit and a screw assembly, the screw assembly having an externally threaded longitudinally extending first portion coupled for rotation with an output shaft of the drive unit, the screw assembly also having an internally threaded second portion fixed to the lid member, the threads of the first portion engaging the threads of the second portion such that rotation of the first portion causes the lid member to translate along the axis of the first portion.

5. The lid assembly of claim 1, wherein the support structure includes a plurality of rollers coupled to the lid member.

6. The lid assembly of claim 5, wherein the support structure further includes a guide track coupled to the vehicle body and operable for supporting the plurality of rollers.

7. The lid assembly of claim 6, wherein at least a portion of the guide track is sloped to cause the lid member to move in both a vertical direction and a horizontal direction as the lid member is moved between the open and closed positions.

8. The lid assembly of claim 6, wherein the guide track includes a first horizontal portion, a second horizontal portion spaced apart from the first horizontal portion and a transition portion coupled to the first horizontal portion at a first end, the transition portion coupled to the second horizontal portion at a second end, wherein the transition portion is sloped between the first and second horizontal portions.

9. The lid assembly of claim 1, wherein the support structure includes a linear slide assembly having a first portion and a second portion, the first portion coupled to the vehicle body, the second portion coupled to the lid member and movable relative to the first portion.

10. A motor vehicle comprising:
    a body defining an opening and including first and second laterally spaced apart sides;
    a floor extending between the pair of laterally spaced apart sides, the floor including a substantially horizontal portion and a cavity recessed below the horizontal portion;
    a closure panel for selectively closing the opening in the body, the closure panel attached to the body for movement between a closed position and an open position such that in the closed position the closure panel at least partially closes the opening and in the open position the closure panel is disposed at least partially within the cavity and completely below the horizontal portion of the floor; and
    a lid assembly having a lid member and a conveyance assembly, the conveyance assembly including a support structure and a drive assembly, the support structure coupled to the lid member and operable for supporting the lid member at a predetermined relationship relative to the floor to permit the lid member to be slid between a first position at least partially clearing the cavity and overlapping the horizontal portion of the floor, and a second position substantially covering the cavity, the drive assembly coupled to the lid member and one of the vehicle body and the floor, the drive assembly operable for conveying the lid member between the first and second positions.

11. The motor vehicle of claim 10, wherein the drive assembly includes a drive unit and a drive cable assembly, the drive unit operable in a first mode, the drive cable assembly including a first end coupled to the lid member at a first point and engaging the drive unit such that operation of the drive unit in the first mode moves the drive cable assembly in a predetermined first cable direction to cause the lid member to slide in a predetermined first lid member direction.

12. The motor vehicle of claim 11, wherein the drive unit is further operable in a second mode and the drive cable assembly further includes a second end coupled to the lid member at a second point and wherein operation of the drive unit in the second mode moves the drive cable assembly in a predetermined second cable direction to cause the lid member to slide in a predetermined second lid member direction.

13. The motor vehicle of claim 10, wherein the drive assembly includes a drive unit and a screw assembly, the screw assembly having an externally threaded longitudinally extending first portion coupled for rotation with an output shaft of the drive unit, the screw assembly also having an internally threaded second portion fixed to the lid member, the threads of the first portion engaging the threads of the second portion such that rotation of the first portion causes the lid member to translate along the axis of the first portion.

14. The motor vehicle of claim 10, wherein the support structure includes a plurality of rollers coupled to the lid member.

15. The motor vehicle of claim 14, wherein the support structure further includes a guide track coupled to the vehicle body and operable for supporting the plurality of rollers.

16. The motor vehicle of claim 15, wherein at least a portion of the guide track is sloped to cause the lid member to move in both a vertical direction and a horizontal direction as the lid member is moved between the open and closed positions.

17. The motor vehicle of claim 15, wherein the guide track includes a first horizontal portion, a second horizontal portion spaced apart from the first horizontal portion and a transition portion coupled to the first horizontal portion at a first end, the transition portion coupled to the second horizontal portion at a second end, wherein the transition portion is sloped between the first and second horizontal portions.

18. The motor vehicle of claim 10, wherein the support structure includes a linear slide assembly having a first portion and a second portion, the first portion coupled to the vehicle body, the second portion coupled to the lid member and movable relative to the first portion.

19. An improved method of adjusting a closure panel of a motor vehicle of the type in which a closure panel is positioned in a first panel position immediately above a rear bumper assembly and oriented substantially vertically, and in which the closure panel is subsequently translated into a second panel position in which the closure panel is located in a cavity completely below a floor of the vehicle, the improvement comprising the steps of:

providing a lid member;

translating the lid member from a first lid position substantially covering the cavity to a second lid position clearing at least a part of the cavity before the closure panel is moved from either of the first and second panel positions; and translating the lid member from the second lid position to the first lid position after the closure panel after the closure panel has been moved to either of the first and second panel positions.

20. The method of claim 19, wherein the lid member is moved along an accurate path as it is translated between the first and second lid positions.

* * * * *